US008129492B1

(12) United States Patent
Barancyk et al.

(10) Patent No.: US 8,129,492 B1
(45) Date of Patent: *Mar. 6, 2012

(54) COATING COMPOSITIONS COMPRISING POLYUREA AND A PHOSPHOROUS-CONTAINING POLYOL

(75) Inventors: Steven V. Barancyk, Wexford, PA (US); Howard L. Senkfor, South Euclid, OH (US); Debra L. Singer, Wexford, PA (US); John M. Furar, Pittsburgh, PA (US); Michael A. Zalich, Pittsburgh, PA (US); Thomas R. Hockswender, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 900 days.

This patent is subject to a terminal disclaimer.

(21) Appl. No.: 12/122,980

(22) Filed: May 19, 2008

Related U.S. Application Data

(63) Continuation-in-part of application No. 11/460,439, filed on Jul. 27, 2006, now Pat. No. 7,928,160.

(51) Int. Cl.
*C08G 71/02* (2006.01)
*C08L 75/02* (2006.01)

(52) U.S. Cl. .............................. 528/72; 525/459; 528/68

(58) Field of Classification Search .................. None
See application file for complete search history.

(56) References Cited

U.S. PATENT DOCUMENTS

| 3,274,130 | A | | 9/1966 | Oertel et al. | |
|---|---|---|---|---|---|
| 3,525,705 | A | * | 8/1970 | Lichtenberg | 521/169 |
| 4,316,006 | A | * | 2/1982 | McEwen | 528/398 |
| 4,637,959 | A | | 1/1987 | Ninomiya et al. | |
| 5,162,388 | A | * | 11/1992 | Primeaux, II | 521/159 |
| 5,175,228 | A | | 12/1992 | Wang et al. | |
| 6,518,325 | B2 | * | 2/2003 | Witte et al. | 521/169 |
| 6,861,452 | B2 | * | 3/2005 | Tokuyasu et al. | 521/107 |
| 2004/0013863 | A1 | | 1/2004 | Terakawa et al. | |
| 2006/0035989 | A1 | * | 2/2006 | Tokuyasu et al. | 521/99 |
| 2006/0160978 | A1 | * | 7/2006 | Gupta et al. | 528/44 |

FOREIGN PATENT DOCUMENTS

| CA | 2057335 A | * | 2/1993 |
|---|---|---|---|
| EP | 0146897 | | 7/1985 |
| FR | 1427799 | | 2/1966 |
| JP | 58-222146 A | * | 12/1983 |
| JP | 4-31424 A | * | 2/1992 |

* cited by examiner

*Primary Examiner* — Robert Sellers
(74) *Attorney, Agent, or Firm* — Krisanne Shideler

(57) ABSTRACT

The present invention is directed to a coating composition comprising polyurea formed from a reaction mixture comprising: (a) a first component comprising isocyanate, wherein said isocyanate comprises an isocyanate functional prepolymer formed from a reaction mixture comprising isocyanate and a material comprising a phosphorus-containing polyol; and (b) a second component comprising an amine.

18 Claims, No Drawings

COATING COMPOSITIONS COMPRISING POLYUREA AND A PHOSPHOROUS-CONTAINING POLYOL

CROSS-REFERENCE TO RELATED APPLICATIONS

This patent application is a Continuation-In-Part (CIP) of patent application having Ser. No. 11/460,439 filed on Jul. 27, 2006, now U.S. Pat. No. 7,928,160, hereby incorporated by reference in its entirety.

FIELD OF THE INVENTION

The present invention is directed to a coating composition comprising polyurea or polyurea and polyurethane.

BACKGROUND

Coating compositions are used in a wide variety of industries. Such industries may include but are not limited to landcraft such as cars, trucks, sport utility vehicles, motorcycles; watercraft such as boats, ships and submarines; aircraft such as airplanes and helicopters, industrial such as commercial equipment and structures including walls and roofs; construction such as construction vehicles and structures including walls and roofs, military such as military vehicles, for example tanks and humvees, and military structures including walls and roofs, for example, ammunition cases and battery enclosures; and the like. In these industries, coatings serve a variety of purposes such as protecting various components against damage due to corrosion, abrasion, impact, chemicals, ultraviolet light, flame and heat, and other environmental exposure as well imparting ballistic and blast mitigation properties to the components onto which they are deposited. Accordingly, considerable efforts have been expended to develop coating compositions with improved properties.

SUMMARY OF THE INVENTION

The present invention is directed to a coating composition comprising polyurea formed from a reaction mixture comprising: (a) a first component comprising isocyanate, wherein said isocyanate comprises an isocyanate functional prepolymer formed from a reaction mixture comprising isocyanate and a material comprising a phosphorus-containing polyol; and (b) a second component comprising an amine. The present invention is also directed to an article partially coated with such a coating composition as well as a method of applying such a coating composition onto the article.

The present invention is also directed to a coating composition comprising: (a) a polyurea formed from a reaction mixture comprising: (i) a first component comprising isocyanate, wherein the isocyanate comprises an isocyanate functional prepolymer formed from a reaction comprising isocyanate and a material comprising a phosphorus-containing polyol; and (ii) a second component comprising an amine; and (b) a polyurethane. The present invention is also directed to an article partially coated with such a coating composition as well as a method of applying such a coating composition onto the article.

The present invention is also directed to a coating composition comprising polyurea formed from a reaction mixture comprising: (a) a first component comprising an isocyanate functional prepolymer and an isocyanate, wherein the isocyanate functional prepolymer is substantially compatible with the isocyanate, and wherein the isocyanate functional prepolymer is formed from a reaction mixture comprising isocyanate and a material comprising a phosphorus-containing polyol; and (b) a second component comprising an amine.

DETAILED DESCRIPTION OF THE INVENTION

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges contained therein. Plural encompasses singular and vice versa. "Including" and like terms are open ended; that is, they mean "including but not limited to". For example, while the invention has been described herein including the claims in terms of "a" polyurea, "a" polyurethane, "an" isocyanate, "an" amine, "a" polyol, "a" polythiol, "a" prepolymer, "a" catalyst, and the like, mixtures of all of such things can be used. Also, as used herein, the term "polymer" is meant to refer to prepolymers, oligomers and both homopolymers and copolymers; the prefix "poly" refers to two or more.

The present invention is directed to a coating composition comprising polyurea formed from a reaction mixture comprising a first component comprising an isocyanate ("isocyanate component"), and a second component comprising an amine ("amine component"); and optionally polyurethane.

The isocyanate component comprises an isocyanate functional prepolymer formed from a reaction mixture comprising isocyanate and a material, such as a flame retardant material, comprising a phosphorus-containing polyol. In certain embodiments, the isocyanate component also comprises an isocyanate (non-prepolymer isocyanate or additional isocyanate) that is not used to form the isocyanate functional prepolymer. It should be noted that the non-prepolymer isocyanate can be the same or different from the isocyanate used to form the isocyanate functional prepolymer. It should also be noted that in certain embodiments, the isocyanate functional prepolymers can be substantially compatible with the non-prepolymer isocyanate. As used herein, "substantially compatible" means the ability of a material to form a blend with other materials that is and will remain substantially homogeneous over time.

The amine component may be referred to herein as a "curative" because it will react or cure with the isocyanate to form a polyurea. In certain embodiments, the ratio of equivalents of isocyanate groups to equivalents of amine groups is greater than 1 and the isocyanate component and the amine component can be applied to a substrate at a volume mixing ratio of 1:1.

As used herein, the term "isocyanate" includes unblocked compounds capable of forming a covalent bond with a reactive group such as a hydroxyl, thiol or amine functional group. Thus, isocyanate can refer to "free isocyanate", which will be understood to those skilled in the art. In certain embodiments, the isocyanate of the present invention can be monofunctional (containing one isocyanate functional group (NCO)) or the isocyanate used in the present invention can be polyfunctional (containing two or more isocyanate functional groups (NCOs)).

Suitable isocyanates for use in the present invention are numerous and can vary widely. Such isocyanates can include those that are known in the art. Non-limiting examples of suitable isocyanates can include monomeric and/or polymeric isocyanates. The isocyanates can be selected from monomers, prepolymers, oligomers, or blends thereof. In an embodiment, the isocyanate can be $C_2$-$C_{20}$ linear, branched, cyclic, aromatic, or blends thereof.

Suitable isocyanates for use in the present invention may include but are not limited to isophorone diisocyanate (IPDI), which is 3,3,5-trimethyl-5-isocyanato-methyl-cyclohexyl isocyanate; hydrogenated materials such as cyclohexylene diisocyanate, 4,4'-methylenedicyclohexyl diisocyanate ($H_{12}$MDI); mixed aralkyl diisocyanates such as tetramethylxylyl diisocyanates, OCN—C(CH$_3$)$_2$—C$_6$H$_4$C(CH$_3$)$_2$—NCO; polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate; and mixtures thereof.

Non-limiting examples of aromatic isocyanates for use in the present invention may include but are not limited to phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate, alkylated benzene diisocyanates, methylene-interrupted aromatic diisocyanates such as methylenediphenyl diisocyanate, 4,4'-isomer (MDI) including alkylated analogs such as 3,3'-dimethyl-4,4'-diphenylmethane diisocyanate, polymeric methylenediphenyl diisocyanate; and mixtures thereof.

In certain embodiments, isocyanate monomer may be used. It is believed that the use of an isocyanate monomer (i.e., residual-free monomer from the preparation of prepolymer) may decrease the viscosity of the polyurea composition thereby improving its flowability, and may provide improved adhesion of the polyurea coating to a previously applied coating and/or to an uncoated substrate. In alternate embodiments of the present invention, at least 1 percent by weight, or at least 2 percent by weight, or at least 4 percent by weight of the isocyanate component comprises at least one isocyanate monomer.

In certain embodiments of the present invention, the isocyanate can include oligomeric isocyanate such as but not limited to dimers such as the uretdione of 1,6-hexamethylene diisocyanate, trimers such as the biuret and isocyanurate of 1,6-hexanediisocyanate and the isocyanurate of isophorone diisocyanate, allophonates and polymeric oligomers. Modified isocyanates can also be used, including but not limited to carbodiimides and uretone-imines, and mixtures thereof. Suitable materials include, without limitation, those available under the designation DESMODUR from Bayer Corporation of Pittsburgh, Pa. and include DESMODUR N 3200, DESMODUR N 3300, DESMODUR N 3400, DESMODUR XP 2410 and DESMODUR XP 2580.

As used herein, "prepolymer" means isocyanate which is pre-reacted with polyamine or other isocyanate reactive group such as polyol. As used herein, "isocyanate functional prepolymer" means prepolymer having at least one isocyanate functional group (NCO). In certain embodiments of the present invention, an isocyanate functional prepolymer comprises isocyanate that is pre-reacted with a material comprising a phosphorus-containing polyol wherein the ratio of equivalents of isocyanate groups (NCOs) to equivalents of hydroxyl groups (OHs) is greater than 1. Suitable isocyanates include those previously disclosed herein. Any phosphorus-containing polyols known in the art can be used in the present invention. Suitable phosphorus-containing polyols include, but are not limited to, phosphate and polyphosphate polyols, phosphite and polyphosphite polyols, phosphonate, polyphosphonate polyols, or combinations thereof. In certain embodiments, the phosphorus-containing polyols are EXOLIT OP 550 (LV) (available from Clariant Corporation), LEVAGARD 4090N (available from Lanxess Corporation), and blends thereof. In certain embodiments, the phosphorus-containing polyols may comprise two or more hydroxyl groups.

In certain embodiments, the phosphorus-containing polyol can be the reaction product of an initial phosphorus-containing polyol with an epoxy functional compound. It will be recognized by those skilled in the art that the reaction product of a polyol with an epoxy functional compound will also be a polyol. The initial phosphorus-containing polyol can include those phosphorus-containing polyols known in the art, such those described in the preceding paragraph. It should be noted that the phosphorus (i.e. inorganic) content of many polyols can render them or the reaction products comprising them substantially incompatible with organic materials, such as the non-prepolymer isocyanates, useful in the "first component" in this invention. As used herein, the term "substantially incompatible" means the inability of a material to form a blend with other materials. Accordingly, the blend will remain substantially heterogeneous over time. Increasing the organic content of the initial phosphorus polyol by modification with another compound, such as an epoxy functional compound, can improve the compatibility of the initial phosphorus polyol with organic materials, such as the non-prepolymer isocyanate, while maintaining the flame retardant properties of the initial phosphorus polyol. Any epoxy functional compounds known in the art may be utilized in the present invention. Suitable epoxy functional compounds include, without limitation, ethylene oxide, propylene oxide, 1,2-epoxybutane, butyl glycidyl ether, and CARDURA E-10P (neodecanoic acid glycidyl ester available from Resolution Performance Products LLC). In certain embodiments, the phosphorus-containing polyol comprises the reaction product of EXOLIT OP 550 (LV) and CARDURA E-10P.

In certain embodiments, the phosphorus-containing polyol can be the reaction product of a phosphorus-containing acid and an epoxy functional compound. Any phosphorus-containing acid known in the art can be used in the present invention. Suitable phosphorus-containing acids include, without limitation, phenyl phosphonic acid, methyl phosphonic acid, ethyl phosphonic acid, propyl phosphoric acid, butyl phosphonic acid, or combinations thereof. In certain embodiments, the phosphorus-containing acid comprises organic functionality, such as alkyl, aryl, alkylaryl groups, for reasons of compatibility with organic materials as described in the preceding paragraph. In certain embodiments, the phosphorus-containing acid comprises phenyl phosphonic acid, and the epoxy functional compound comprises propylene oxide. In certain embodiments, the phosphorus-containing acid comprises phenyl phosphonic acid and the epoxy comprises CARDURA E10-P.

In certain embodiments, the phosphorus-containing polyol can be the reaction product of a phosphorus-containing acid and an epoxy functional compound, and wherein the reaction is conducted in the presence of an initial phosphorus-containing polyol. In certain embodiments, the phosphorus-containing polyol can be the reaction product of a phosphorus-containing acid, an epoxy functional compound, and, optionally, an initial phosphorus-containing polyol. For example, in certain embodiments, the phosphorus-containing acid comprises phenyl phosphonic acid, the epoxy comprises propylene oxide, and the phosphorus-containing polyol comprises EXOLIT OP 550 (LV). In another particular embodiment, the phosphorus-containing acid comprises phenyl phosphonic acid, the epoxy comprises CARDURA E-10P, and the first phosphorus-containing polyol comprises EXOLIT OP 550 (LV).

A polyurea coating composition, which can exhibit improved flame and/or heat resistance, can comprise the phosphorus-containing isocyanate prepolymer. As used herein, the term "flame retardant", "flame resistant", "heat retardant" and "heat resistant" and the like refers to the ability to withstand flame or heat without igniting. As used herein, the terms "improved flame resistance" and "improved heat resistance" means any degree of improved flame resistance or heat resistance, respectively that is demonstrated by a coating composition with flame retardant material as compared to a coating composition without flame retardant material.

The isocyanate functional prepolymer may further comprise an additional polyol, and/or polythiol, and/or polyamine. Suitable polyols are numerous and can vary widely. Such polyols can include those that are known in the art. Non-limiting examples of suitable polyols can include but are not limited to polyether polyols, polyester polyols, polyurea polyols (e.g., the Michael reaction product of an amino functional polyurea with a hydroxyl functional (meth)acrylate), polycaprolactone polyols, polycarbonate polyols, polyurethane polyols, poly vinyl alcohols, addition polymers of unsaturated monomers with pendant hydroxyl groups such as those containing hydroxy functional (meth)acrylates, allyl alcohols and mixtures thereof. Non-limiting examples can include but are not limited to diols such as 1,2-butane diol, glycols such as neopentyl glycol and mixtures thereof. Further examples include commercially available materials such as TERATHANE 650 from Invista Corporation. In certain embodiments, wherein the isocyanate functional prepolymer comprises an additional polyol, the ratio of equivalents of isocyanate groups (NCOs) to equivalents of hydroxyl groups (OHs) is greater than 1.

A "polythiol" refers to such a compound having more than one SH group, such as a dithiol or higher functionality thiol. Suitable polythiols are numerous and can vary widely. Such polythiols can include those that are known in the art. Non-limiting examples of suitable polythiols can include, but not limited to, trimethylolpropane tri mercaptoacetate, pentaerythritol tetramercaptoacetate, trimethylolpropane tris(β-thiopropionate) and pentaerythritol tetrakis(β-thiopropionate), thioplast G4 and G44 (available from Akzo Nobel), 3,6-dioxa-1,8-octanedithiol (available from Sigma-Aldrich), or mixtures thereof. In certain embodiments, wherein the isocyanate functional prepolymer comprises a polythiol, the ratio of equivalents of isocyanate groups (NCOs) to equivalents of thiol groups (SHs) is greater than 1.

Suitable polyamines are numerous and can vary widely. Such polyamines can include those that are known in the art. Non-limiting examples of suitable polyamines can include but are not limited to primary and secondary amines, and mixtures thereof, such as any of those listed herein. Amine terminated polyureas may also be used. Amines comprising tertiary amine functionality can be used provided that the amine further comprises at least two primary and/or secondary amino groups. In certain embodiments, wherein the isocyanate functional prepolymer comprises a polyamine, the ratio of equivalents of isocyanate groups (NCOs) to equivalents of amine groups (NHs) is greater than 1.

As noted above, the polyurea of the present compositions is formed from a reaction mixture comprising an isocyanate component and an amine component.

Suitable amines for use in the present invention are numerous and can vary widely. Such amines can include those that are known in the art such as primary and secondary amines, and mixtures thereof. In certain embodiments, the amine may include monoamines, or polyamines having at least two functional groups such as di-, tri-, or higher functional amines; and mixtures thereof. In further embodiments, the amine may be aromatic or aliphatic such as cycloaliphatic, or mixtures thereof. Non-limiting examples of suitable monoamines can include aliphatic polyamines such as, but not limited to, ethylamine, isomeric propylamines, butylamines, pentylamines, hexylamines, cyclohexylamine, and benzylamine. Suitable primary polyamines include, but are not limited to, ethylene diamine, 1,2-diaminopropane, 1,4-diaminobutane, 1,3-diaminopentane (DYTEK EP, Invista), 1,6-diaminohexane, 2-methyl-1,5-pentane diamine (DYTEK A, Invista), 2,5-diamino-2,5-dimethylhexane, 2,2,4- and/or 2,4,4-trimethyl-1, 6-diamino-hexane, 1,11-diaminoundecane, 1,12-diaminododecane, 1,3- and/or 1,4-cyclohexane diamine, 1-amino-3, 3,5-trimethyl-5-aminomethyl-cyclohexane, 2,4- and/or 2,6-hexahydrotoluoylene diamine, 2,4'-diaminodicyclohexyl methane, 4,4'-diaminodicyclohexyl methane (PACM-20, Air Products) and 3,3'-dialkyl-4,4'-diaminodicyclohexyl methanes (such as 3,3'-dimethyl-4,4'-diaminodicyclohexyl methane (DIMETHYL DICYKAN or LAROMIN C260, BASF; ANCAMINE 2049, Air Products) and 3,3'-diethyl-4,4'-diaminodicyclohexyl methane), 2,4- and/or 2,6-diaminotoluene, 3,5-diethyltoluene-2,4-diamine, 3,5-diethyltoluene-2,6-diamine, 3,5-dimethylthio-2,4-toluenediamine, 3,5-dimethylthio-2,4-toluenediamine, 2,4'- and/or 4,4'-diaminodiphenyl methane, dipropylene triamine, bis hexamethylene triamine, or combinations thereof. Polyoxyalkyleneamines are also suitable. Polyoxyalkyleneamines comprise two of more primary or secondary amino groups attached to a backbone, derived, for example, from propylene oxide, ethylene oxide, butylene oxide or a mixture thereof. Examples of such amines include those available under the designation JEFFAMINE, such as, without limitation, JEFFAMINE D-230, D-400, D-2000, HK-511, ED-600, ED-900, ED-2003, T-403, T-3000, T-5000, SD-231, SD-401, SD-2001, and ST-404 (Huntsman Corporation). Such amines have an approximate molecular weight ranging from 200 to 7500.

Secondary cycloaliphatic diamines may also be used in the present invention. Suitable cycloaliphatic diamines include, without limitation, JEFFLINK 754 (Huntsman Corporation), CLEARLINK 1000 (Dorf-Ketal Chemicals, LLC), and aspartic ester functional amines, such as those available under the name DESMOPHEN such as DESMOPHEN NH1220, DESMOPHEN NH 1420, and DESMOPHEN NH 1520 (Bayer Materials Science LLC.). Other suitable secondary amines that can be used in the present invention include the reaction products of materials comprising primary amine functionality, such as those described herein, with acrylonitrile. For example, the secondary amine can be the reaction product of 4,4'-diaminodicyclohexylmethane and acrylonitrile. Alternatively, the secondary amine can be the reaction product of isophorone diamine and acrylonitrile, such as POLYCLEAR 136 (available from Hansen Group LLC).

Other amines that can be used in the present invention include adducts of primary polyamines with mono or polyepoxies such as the reaction product of isophorone diamine with Cardura E-10P.

The present polyurea compositions may also comprise one or more amines such as those describe in U.S. patent application Ser. Nos. 11/611,979, 11/611,984, 11/611,988, 11/611,982, and 11/611,986, all of which are incorporated in their entirety herein by reference.

In certain embodiments, the amine component may be a mixture of primary and secondary amines wherein the primary amine may be present in an amount of from 20 to 80 percent by weight or from 20 to 50 percent by weight, with the balance being secondary amine. In other embodiments, the primary amines present in the composition may have a molecular weight greater than 200, and the secondary amines present may include diamine having molecular weight of at least 190, or from 210 to 230.

In certain embodiments, the second component of the composition, and/or the composition itself, are substantially free of primary amine functionality (unreacted primary amino groups). "Substantially free of primary amine functionality" and like terms means that theoretically there is no primary amine functionality but there maybe some primary amine functionality present that is purely incidental, i.e., impurities in amines that are otherwise secondary amine functional and/or trace primary amine functionality that did not react.

In another embodiment, the amine component may include at least one secondary amine which may be present in an amount of from 20 to 80 percent by weight or 50 to 80 percent by weight.

In another embodiment, the amine component may include aliphatic amine. It is believed that the presence of aliphatic amine may provide enhanced durability. In this embodiment, the amine typically is provided as a liquid having a relatively low viscosity, for example, less than about 100 mPa·s at 25° C.

In certain embodiments, the coating composition may comprise an additional flame and/or a heat resistant material, such as a flame retardant material, in addition to the isocyanate functional pre-polymer described herein. The additional flame retardant material can be added to the isocyanate and/or the amine component of the present invention. Any flame retardant material known in the art can be used as the additional flame retardant material in the present invention.

In certain embodiments, a flame retardant material comprising graphite can be added to the isocyanate and/or the amine component of the coating compositions of the present invention. Suitable graphites are known in the art and can include natural and synthetic graphites. Non-limiting examples of suitable graphites can include expandable graphite and/or exfoliated graphite. In certain embodiments, expandable graphite in the form of a solid or powder is intercalated with an acid such as, but not limited to, organic acids (e.g. acetic acid) and inorganic acids (e.g. $H_2SO_4$ and $HNO_3$). Non-limiting examples of such graphites include commercially available graphites under the tradenames NORD-MIN from Nano Technologies, Incorporated and NYAGRAPH including but not limited to NYAGRAPH 35, 251 and 351, from Nyacol, Incorporated. In certain embodiments, if the graphite is added to the first component, the graphite can be substantially compatible with the isocyanate functional pre-polymers and the additional isocyanate.

Other suitable flame retardant materials include, without limitation, the flame retardant polymers disclosed in U.S. Pat. Nos. 6,015,510 (column 4, line 31 thru column 5, line 41) and 5,998,503 (column 4, line 31 thru column 5, line 41), halogenated phosphates or halogen free phosphates, powdered or fumed silica, layered silicates, aluminum hydroxide, brominated fire retardants, tris(2-chloropropyl)phosphate, tris(2,3-dibromopropyl)phosphate, tris(1,3-dichloropropyl)phosphate, diammonium phosphate, various halogenated aromatic compounds, antimony oxide, alumina trihydrate, polyvinyl chloride and the like, and mixtures thereof. In certain embodiments, the flame retardant material is tris(2-chloropropyl)phosphate, which is available from Supresta under the designation FYROL PCF. When the flame retardant is a low viscosity liquid, it also can reduce the viscosity of the isocyanate and/or amine component, enhancing sprayability.

In certain embodiments, the flame retardant material may include at least one phosphinic salt of the formula (I), and/or one diphosphinic salt of the formula (II), and/or polymers of these,

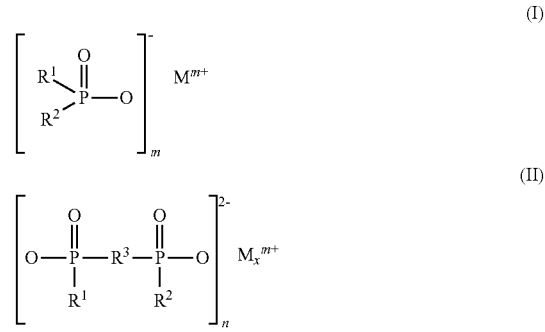

wherein $R^1$ and $R^2$ are identical or different and are $C_1$-$C_6$-alkyl, linear or branched, and/or aryl; $R^3$ is $C_1$-$C_{10}$-alkylene, linear or branched, $C_6$-$C_{10}$-arylene, -alkylarylene, or -arylalkylene; M is Mg, Ca, Al, Sb, Sn, Ge, Ti, Zn, Fe, Zr, Ce, Bi, Sr, Mn, Li, Na, K and/or a protonated nitrogen base; m is from 1 to 4; n is from 1 to 4; x is from 1 to 4, and also may include at least one synergistic halogen-containing component. The flame retardant component of this embodiment is further described in United States Patent Publication Nos. 2005/0004277A1 and 2005/0004278A1, from paragraph [0025] to paragraph [0070] in both applications.

In certain embodiments, the additional flame retardant may optionally contain mineral oxides such as but not limited to zinc borate, barium metaborates, calcium borate and/or melamine derivatives such as, but not limited to, melamine cyanurate, melamine phosphates, polymelamine phosphates, melamine pyrophosphates, polymelamine pyrophosphates, melamine borate, other melamine derivatives and the like, and mixtures thereof.

The amount of the additional flame retardant material in addition to the isocyanate functional pre-polymer present in the coating composition of the present invention can vary widely. In certain embodiments, the additional flame retardant material and the isocyanate functional pre-polymer comprise up to 35 percent by weight based on the total weight of reactants in the coating composition.

In certain embodiments, the coating compositions used according to the present invention may include a blend of polyurea and polyurethane. As used herein, "polyurea" includes both polyurea and blends of polyurea and polyurethane. It will be appreciated by those skilled in the art that polyurethane can be formed as a by-product in the reactions according to the present invention. In alternate embodiments, the polyurethane can be formed in-situ and/or it can be added to the reaction mixture; a non-limiting example is an isocyanate functional prepolymer formed by the reaction of a polyol and a isocyanate as disclosed herein. A non-limiting example of polyurethane formed in-situ may include the reaction product of isocyanate and hydroxyl-functional material. Non-limiting examples of suitable isocyanates may include those described herein. Non-limiting examples of suitable hydroxyl-functional material may include polyols such as those described herein. Another example of polyurethane formed in-situ may include the reaction product of a hydroxyl functional prepolymer and isocyanate-functional material.

Suitable examples of these reactants may include those described herein. The coating composition of the present invention may be formulated and applied using various techniques known in the art.

The polyurea coating compositions of the present invention may optionally include materials standard in the art such as but not limited to fillers, fiberglass, stabilizers, thickeners, adhesion promoters, catalysts, colorants, antioxidants, UV absorbers, hindered amine light stabilizers, rheology modifiers, flow additives, anti-static agents and other performance or property modifiers which are well known in the art of surface coatings, and mixtures thereof. In alternate embodiments, such materials may be combined with the isocyanate, the amine, or both. In a further embodiment, at least one of these materials is added to the amine prior to reaction with isocyanate.

In another embodiment, the composition further comprises a filler such as but not limited to clay, silica or mixtures thereof. In a further embodiment, the filler is added to the amine. Such a coating composition has been found to have better adhesion to a metal substrate than a similar coating composition without clay or silica (as determined in accordance with the test method in ASTM D 1876, without use of a fixturing device).

The clay may be selected from any of a variety of clays known in the art including montmorillonite clays such as bentonite, kaolin clays, attapulgite clays, sepiolite clay, and mixtures thereof. Additionally, the clay may be surface treated as is known in the art. Any suitable surface treatment may be used. In a non-limiting embodiment, the clay is treated with one or more of the following amines:

$R^1\text{—}NR^2R^3$

$R^1\text{—}N^+R^2R^3R^7$

$R^4\text{—}C(O)\text{—}NR^5\text{—}R^6\text{—}NR^2R^3$

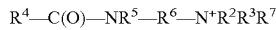

$R^4\text{—}C(O)\text{—}NR^5\text{—}R^6\text{—}N^+R^2R^3R^7$ wherein $R^1$ and $R^4$ are independently $C_4$-$C_{24}$ linear, branched, or cyclic alkyl, aryl, alkenyl, aralkyl or aralkyl, $R^2$, $R^3$, $R^5$ and $R^7$ are independently H or $C_1$-$C_{20}$ linear, branched, or cyclic alkyl, aryl, alkenyl, aralkyl or aralkyl, and $R^6$ is $C_1$-$C_{24}$ linear, branched, or cyclic alkylene, arylene, alkenylene, aralkylene or aralkylene.

In a non-limiting embodiment, surface treated bentonite as described in U.S. Pat. No. 3,974,125 may be used.

In an embodiment, the clay may be present in the coating composition of the present invention in an amount of at least 0.5 percent by weight, or at least 1 percent by weight, or at least 1.5 percent by weight. In other embodiments, the clay can be present in an amount of up to 6 percent by weight, or up to 5 percent by weight, or up to 4 percent by weight of the composition. The amount of clay in the coating composition can be any value or range between any values recited above, with the proviso that the adhesion properties and application viscosity of the coating composition are not adversely affected.

In another embodiment, the coating composition of the present invention may include silica. Any suitable silica can be used, provided that application and coating performance properties are not adversely impacted. The silica may be selected from surface-treated/surface-modified silica, untreated/unmodified silica and mixtures thereof. Non-limiting examples of suitable silica may include but are not limited to precipitated, fumed, colloidal and mixtures thereof. In alternate non-limiting embodiments, the silica may be present in an amount such that it constitutes at least 0.5 percent by weight, or at least 1 percent by weight, or at least 1.5 percent by weight of the coating composition. In other embodiments, the silica can be present such that it constitutes up to 6 percent by weight, or up to 5 percent by weight, or up to 4 percent by weight of the composition. The amount of silica in the two-component coating composition can be any value or range between any values recited above, provided that the adhesion properties and application viscosity of the coating composition are not adversely affected.

In another embodiment, the coating composition of the present invention may include an adhesion promoter which may enhance adhesion of the coating composition to a substrate. When the coating composition of the present invention is applied over a first coating, an adhesion promoter may be present in the first coating composition, or it may be added to the isocyanate and/or amine of the second coating composition, or it may be applied as a separate layer directly to the substrate or first coating prior to application of the second coating thereto. When applied as a separate layer, the adhesion promoter may be applied using a variety of conventional techniques such as but not limited to wiping, dipping, roll coating, curtain coating, spraying or the like.

Non-limiting examples of suitable adhesion promoters for use in the present invention may include amine-functional materials such as 1,3,4,6,7,8-hexahydro-2H-pyrimido-(1,2-A)-pyrimidine, hydroxyethyl piperazine, N-aminoethyl piperizine, dimethylamine ethylether, tetramethyliminopropoylamine (commercially available as POLYCAT 15 from Air Products and Chemicals, Inc.), blocked amines such as an adduct of IPDI and dimethylamine, tertiary amines, such as 1,5-diazabicyclo[4.3.0]non-5-ene, 1,8-diazabicyclo[5.4.0]undec-7-ene, 1,4-diazabicyclo[2.2.2]octane, 1,5,7-triazabicyclo[4.4.0]dec-5-ene, and 7-methyl-1,5,7-triazabicyclo[4.4.0]dec-5-ene, amino silanes such as γ-aminopropyltriethoxysilane (commercially available as Silquest A1100 from Momentive Performance Mateirals, Inc.), melamine or amino melamine resin (e.g. Cymel 220 or Cymel 303, available from Cytec Industries Inc.), metal complexes including metal chelate complexes such as an aluminum chelate complex (e.g. K-KAT 5218 available from King Industries) or tin-containing compositions such as stannous octoate and organotin compounds such as dibutyltin dilaurate and dibutyltin diacetate, urethane acrylate compositions, salts such as chlorine phosphate, butadiene resins such as an epoxidized, hydroxyl terminated polybutadiene resin (e.g. POLY BD 605E available from Atofina Chemicals, Inc.), polyester polyols (e.g. CAPA 3091, a polyester triol available from Solvay America, Inc., and urethane acrylate compositions such as an aromatic urethane acrylate oligomer (e.g. CN999 available from Sartomer Company, Inc.); and mixtures thereof. For example, the adhesion promoter disclosed in U.S. patent application Ser. No. 11/591,312, which is incorporated in its entirety herein by reference, may be used in the present invention.

It is believed that the underlying mechanism which enhances adhesion may involve one or more phenomena such as but not limited to catalysis of a reaction between reactive groups on the substrate or previously applied coating (e.g. hydroxyl groups) and functional groups of the coating composition, reaction with the substrate or bonding with the substrate such as via hydrogen bonding, although the inventors do not wish to be bound by any mechanism.

In an embodiment, the adhesion promoter comprises at least one component selected from melamine, urethane acrylate, metal chelate complex, salt, tin-containing compound and polyhydric polymer.

In certain embodiments, the coating may further comprise small amounts of solvent and in certain embodiments the coating may be substantially solvent-free. "Substantially solvent-free" means that the coating may contain a small amount of solvent, such as 5%, 2%, 1% or less.

In another embodiment, the coating composition of the present invention may include a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In an embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

In another embodiment, the coating composition of the present invention when applied to a substrate possesses color that matches the color of an associated substrate. As used herein and in the claims, the term "matches" or like terms when referring to color matching means that the color of the coating composition of the present invention substantially corresponds to a desired color or the color of an associated substrate. This can be visually observed, or confirmed using spectroscopy equipment.

The coatings of the present invention may be part of a multi-layer coating composite comprising a substrate with various coating layers such as a pretreatment layer, electocoat, primer, base coat and clear coat. At least one of the base coat and clear coat may contain colorant and/or the clear coat may contain an adhesion promoter. It is believed that the addition of adhesion promoter to the clear coat may improve the adhesion between the clear coat and the coating composition applied thereover, although the inventors do not wish to be bound by any mechanism. In this embodiment, the coating composition of the present invention may be the reaction product of isocyanate and amine with a colorant additive. The coating composition of the present invention containing colorant may be applied to at least a portion of the article or structure. The color of the coated article or structure may match the color of an associated substrate. An "associated substrate" may refer to a substrate which comprises the article or structure but is not coated with the coating composition of the present invention; or a substrate which is attached, connected or in close proximity to the article or structure, but is not coated with the coating composition of the present invention.

Accordingly, the present invention is further directed to methods for coating a substrate comprising applying to at least a portion of the substrate any of the coating compositions described herein. In an embodiment, conventional spraying techniques may be used. In this embodiment, the isocyanate and amine may be combined such that the ratio of equivalents of isocyanate groups to equivalents of amine groups is greater than 1 and the isocyanate and amine can be applied to a substrate at a volume mixing ratio of 1:1; and the reaction mixture may be applied to an uncoated or coated substrate to form a first coating on the uncoated substrate or a subsequent coating on the coated substrate. When determining the ratio of equivalents of isocyanate groups to equivalents of reactive amine groups, the total amine groups are taken into consideration; that is the amine groups from any amine or amines used in the coating.

It will be appreciated that the present compositions are two component or "2K" compositions, wherein the isocyanate component and the amine component are kept separate until just prior to application. Such compositions will be understood as curing under ambient conditions, although a heated forced air or a heat cure can be applied to accelerate final cure or to enhance coating properties such as adhesion. In an embodiment, the sprayable coating composition may be prepared using a two-component mixing device. In this embodiment, isocyanate and amine are added to a high pressure impingement mixing device. The isocyanate is added to the "A-side" and amine is added to the "B-side". The A- and B-side streams are impinged upon each other and immediately sprayed onto at least a portion of an uncoated or coated substrate. The isocyanate and the amine react to produce a coating composition which is cured upon application to the uncoated or coated substrate. The A- and/or B-side can also be heated prior to application, such as to a temperature of 140° F. Heating may promote a better viscosity match between the two components and thus better mixing, but is not necessary for the curing reaction to occur.

The volume mixing ratio of the isocyanate and amine may be such that the resulting isocyanate and amine reaction mixture can be applied to a substrate at a volume mixing ratio of 1:1. As used herein, "volume mixing ratio 1:1" means that the volume mixing ratio varies by up to 20% for each component, or up to 10% or up to 5%.

It is believed that the ratio of equivalents of isocyanate groups to amine groups may be selected to control the rate of cure of the coating composition of the present invention. It has been found that cure and adhesion advantages may result when the ratio of the equivalents of isocyanate groups to amine groups (also known as the reaction index) is greater than one, such as from 1.5:1 to 0.9:1 or from 1.3:1 to 1.05:1.

In a non-limiting embodiment, a commercially available mixing device available commercially under the designation GUSMER VR-H-3000 proportioner fitted with a GUSMER Model GX-7 spray gun may be used. In this device, pressurized streams of the A- and B-side components are delivered from two separate chambers, are impacted or impinged upon each other at high velocity, to mix the two components and form a coating composition, which may be applied to an uncoated or coated substrate using the spray gun. The mixing forces experienced by the component streams may depend upon the volume of each stream entering the mixing chamber per unit time and the pressure at which the component streams are delivered. A 1:1 volume ratio of the isocyanate and amine per unit time may equalize these forces.

Another suitable application device known in the industry includes a "static mix tube" applicator. In this device, the isocyanate and amine are each stored in a separate chamber. As pressure is applied, each of the components is brought into a mixing tube in a 1:1 ratio by volume. Mixing of the components is effected by way of a torturous or cork screw pathway within the tube. The exit end of the tube may have atomization capability useful in spray application of the reaction mixture. Alternatively, the fluid reaction mixture may be applied to a substrate as a bead. A static mix tube applicator is commercially available from Cammda Corporation or Plas-Pak Industries, Inc.

The coating composition of the present invention may be applied to a wide variety of substrates. Non-limiting examples of suitable substrates can include, but are not limited to, metal, natural and/or synthetic stone, ceramic, glass, brick, cement, concrete, cinderblock, wood and composites and laminates thereof; wallboard, drywall, sheetrock, cement board, plastic, paper, PVC, roofing materials such as shingles, roofing composites and laminates, and roofing drywall, styrofoam, plastic composites, acrylic composites, ballistic composites, asphalt, fiberglass, soil, gravel and the like. Metals can include but are not limited to aluminum, cold rolled steel, electrogalvanized steel, hot dipped galvanized steel, titanium and alloys; plastics can include but are not limited to TPO, SMC, TPU, polypropylene, polycarbonate, polyethylene, and polyamides (Nylon). The substrates can be primed metal and/or plastic; that is, an organic or inorganic layer is applied thereto. Further, the coating composition of the present invention can be applied to said substrates to impart one or more of a wide variety of properties such as but not limited to corrosion resistance, abrasion resistance, impact damage, flame and/or heat resistance, chemical resistance, UV light resistance, structural integrity, ballistic mitigation, blast mitigation, sound dampening, decoration and the like. As used herein, "ballistic mitigation" refers to reducing or alleviating the effects of a bullet or other type of firearm ammunition. As used herein, "blast mitigation" refers to reducing or alleviating the secondary effects of a blast. In non-limiting examples, the coating composition of the present invention can be applied to at least a portion of a building structure or an article of manufacture such as but not limited to a vehicle. "Vehicle" includes but is not limited to civilian, commercial, and military land-, water-, and air-vehicles, for example, cars, trucks, boats, ships, submarines, airplanes, helicopters, humvees and tanks. The article of manufacture can be a building structure. "Building structure" includes but is not limited to at least a portion of a structure including residential, commercial and military structures, for example, roofs, floors, support beams, walls and the like. "Building structure" also includes structures, including those that define apertures, associated with mining. Typical mine structures include mains, submains, gate road entries, production panels, bleeders, and other active working areas associated with underground mining. Accordingly, the present compositions can also be used to coat mine supports, beams, seals, stoppings, ribs, exposed strata, and the like and can be further used, alone or in conjunction with other layers, to seal and/or reinforce mine structures. As used herein, the term "substrate" may refer to a surface, either external or internal, on at least a portion of an article of manufacture or the article of manufacture itself. In an embodiment, the substrate is a truck bed.

In an embodiment, the coating composition of the present invention may be applied to a carrier film. The carrier film can be selected from a wide variety of such materials known in the art. Non-limiting examples of suitable carrier films may include, but are not limited to thermoplastic materials, thermosetting materials, metal foils, cellulosic paper, synthetic papers, and mixtures thereof. As used herein, the term "thermoplastic material" refers to any material that is capable of softening or fusing when heated and of solidifying (hardening) again when cooled. Non-limiting examples of suitable thermoplastic materials may include polyolefins, polyurethanes, polyesters, polyamides, polyureas, acrylics, and mixtures thereof. As used herein, the term "thermosetting material" refers to any material that becomes permanently rigid after being heated and/or cured. Non-limiting examples may include polyurethane polymers, polyester polymers, polyamide polymers, polyurea polymers, polycarbonate polymers, acrylic polymers, resins, copolymers thereof, and mixtures thereof. As used herein, the term "foil" refers to a thin and flexible sheet of metal. Non-limiting examples may include aluminum, iron, copper, manganese, nickel, combinations thereof, and alloys thereof. As used herein, the term "synthetic paper" refers to synthetic plain or calendered sheets that can be coated or uncoated and are made from films containing polypropylene, polyethylene, polystyrene, cellulose esters, polyethylene terephthalate, polyethylene naphthalate, poly 1,4-cyclohexanedimethylene terephthalate, polyvinyl acetate, polyimide, polycarbonate, and combinations and mixtures thereof. A non-limiting example of suitable synthetic paper is available under the tradename TESLIN from PPG Industries, Inc., Pittsburgh, Pa.

In an embodiment, a carrier film having a first and second major surface may serve as a substrate and the coating composition of the present invention may be applied to the first surface of the film to form a coating layer.

In other embodiments, the carrier film may have a film thickness of at least 0.5 μm, or at least 1 μm, or at least 2 μm, or at least 3 μm or at least 5 μm. In other embodiments, the carrier film may have a thickness of up to 100 μm, or up to 90 μm, or up to 75 μm, or up to 50 μm, or up to 40 μm. The carrier film can vary and range between any thickness recited above provided that the carrier film can adequately support the coating layer and is sufficiently flexible for a desired end use application.

In another embodiment, the carrier film may include an adhesive layer superimposed on the second surface of the film. Any suitable adhesive composition known in the art can be used to form the adhesive layer. Suitable adhesive compositions include those that contain at least one acrylic latex polymer prepared from a monomer composition that includes $C_1$-$C_5$ linear, branched, or cyclic alkyl (meth)acrylate monomers.

In a further embodiment, a temporary protective cover may be superimposed over the adhesive layer. Any suitable material can be used as the protective cover. Suitable materials include, but are not limited to, paper and polymeric materials. In these embodiments, the temporary protective cover can be removed and the second side of the carrier film may be applied or adhered to a desired substrate.

In certain embodiments, the coating composition of the present invention may be applied to a bare (e.g., untreated, uncoated) substrate, a pretreated substrate and/or coated substrate having at least one other coating. In an embodiment, the coating composition of the present invention may be applied to a multi-layer coating composite. The first coating applied to a substrate may be selected from a variety of coating compositions known in the art for surface coating substrates. Non-limiting examples may include but are not limited to electrodepositable film-forming compositions, primer compositions, pigmented or non-pigmented monocoat compositions, pigmented or non-pigmented base coat compositions, transparent topcoat compositions, industrial coating compositions, and the like. In another non-limiting embodiment, the coating composition of the present invention may be applied to a multi-layer coating composite comprising a pretreated substrate and coating layers such as but not limited to electrocoat, primer, base coat, clear coat, and combinations thereof.

In another embodiment, the coating composition of the present invention can be used in a two-coat application resulting in a textured surface. A first coat is applied to an uncoated or coated substrate to produce a smooth, substantially tack-free layer. The Tack-Free Method is used to determine if the layer is substantially tack-free. The Tack-Free Method includes spraying the coating composition in one coat onto a non-adhering plastic sheet to a thickness of from 10 to 15 mil (254-381 microns). When spraying is complete, an operator, using a loose fitting, disposable vinyl glove, such as one commercially available under the trade name Ambidex Disposable Vinyl Glove by Marigold Industrial, Norcross Ga., gently touches the surface of the coating. The coating may be touched more than one time by using a different fingertip. When the glove tip no longer sticks to, or must be pulled from, the surface of the layer, the layer is said to be substantially tack-free. The time beginning from the completion of spraying until when the coating is substantially tack-free is said to be the tack-free time. In an embodiment, the tack-free time and the cure time may be controlled by balancing levels of various composition components such as the ratio of primary amine to secondary amine.

A second coat may then be applied to the first coating layer as a texturizing layer or "dust coating". The second coating layer can be applied by increasing the distance between the application/mixing device and the coated substrate to form discrete droplets of the coating composition prior to contacting the coated substrate thereby forming controlled non-uniformity in the surface of the second layer. The substantially tack-free first layer of the coating is at least partially resistant to the second layer; i.e., at least partially resistant to coalescence of the droplets of coating composition sprayed thereon as the second layer or dust coating such that the droplets adhere to but do not coalesce with the previous layer(s) to create surface texture. The final coating layer typically exhibits more surface texture than the first or previous coating layers. An overall thickness of the coating layers may range from 20 to 1000 mils, or from 40 to 150 mils, or from 60 to 100 mils (1524-2540 microns), or from 500 to 750 mils. In a non-limiting embodiment, the first layer may be the majority of the total thickness and the dust coating may be from 15-50 mils (381-1270 microns). In various embodiments of the present invention, the "first" coating layer may comprise one, two, three or more layers; and the "second" coating layer may be one or more subsequent layers applied thereover. For example, four polyurea layers may be applied, with the fourth layer being the dust coating and each layer having a thickness of from 15 to 25 mil (381-635 microns). It will be appreciated that these coating layers are relatively "thick". The coating compositions of the present invention can also be applied as much thinner layers as well, such as 0.1 to less than 15 mils, such as 0.1 to 10, 0.5 to 3, or 1 to 2 mils. Any of the endpoints within these ranges can also be combined. Such layers can be used alone or in conjunction with other coating layers, such as any of those known in the art or otherwise described herein. When applied at a sufficient thickness (e.g., 10 to 1000 mils, such as 100 to 200 mils, or 125 mils+/−10 mils), the present polyurea layer(s) can provide blast and/or ballistic mitigation.

In other embodiments, the coating layers may comprise the same or different polyurea or polyurea/polyurethane coating compositions. For example, the first layer may be a polyurea composition comprising aliphatic and/or aromatic amine components and/or aliphatic and/or aromatic isocyanate; and the second layer may comprise the same or different combination of aliphatic and/or aromatic amine components and/or aliphatic and/or aromatic isocyanate. "Amine component" in this context means any amine used in the present coatings. In another embodiment, the outermost coating layer may comprise a coating composition that provides a desired durability. The desired durability may depend upon the use of the coating composition of the present invention and/or the substrate to which it may be applied. In an embodiment, a combination of aliphatic and/or aromatic amine and/or isocyanate may be selected such that the composition of the outermost layer has substantial durability. For example, the outermost coating layer may have a durability of from 1000 kJ to 6000 kJ, or from 800 hours to 4000 hours, when tested using a Weatherometer (Atlas Material Testing Solutions) in accordance with method SAE J1960. In this embodiment, the first layer may be a polyurea composition comprising isocyanate and amine, wherein at least one of the amine and/or polyisocyante may be aromatic, and the second layer may be a polyurea composition comprising aliphatic amine and aliphatic isocyanate.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Example A

A modified polyphosphate diol was prepared from the following ingredients:

| Ingredient | Amt in g |
| --- | --- |
| Exolit OP 550 (LV)[1] | 233.4 |
| p-toluene sulfonic acid | 3.6 |
| Cardura E-10P[2] | 130.1 |

[1]Polyphosphate diol available from Clariant Corporation.
[2]Neodecanoic acid glycidyl ester available from Resolution Performance Products LLC.

The above ingredients were charged to a suitable reactor equipped with a heating mantle, reflux condenser, overhead stirrer, thermocouple, and $N_2$ inlet. A $N_2$ blanket was applied to the reactor and the mixture heated in 10° C. increments over two hours to 140° C. The reaction mixture was held at this temperature and sampled for epoxy equivalent weight approximately every 4 hours. After 13.25 hours, the epoxy equivalent weight was determined to be infinite (no end point in titration) and the reaction was judged to be complete. The resulting resin was a clear, viscous fluid and was found to have a measured solids (110° C., 1 hr) of 88.4 percent, a viscosity of Z2- on the Gardner-Holt scale, an acid value of 2.7 mg KOH/g, a hydroxyl value of 82.2 mg KOH/g, and a $M_w$ of 1126, a $M_n$ of 553, a $M_z$ of 1866, and a peak molecular weight of 620 as determined by gel permeation chromatography versus a polystyrene standard.

Example B

A compatible isocyanate component comprising a phosphorus-containing isocyanate-functional prepolymer was prepared from the following ingredients as described below:

| Ingredients | Parts by Weight (grams) |
| --- | --- |
| DESMODUR XP2580[3] | 82 |
| RESIN FROM EXAMPLE A | 88 |
| Dibutyltin dilaurate | 0.02 |
| FYROL PCF[4] | 77 |
| DESMODUR XP2580 | 390 |
| DESMODUR XP2410[5] | 210 |

[3]Polyisocyanate available from Bayer Material Science Corporation.
[4]tris (2-chloroisopropyl) phosphate flame retardant available from Supresta.
[5]Polyisocyanate available from Bayer Material Science Corporation.

A total of 82 grams of DESMODUR XP2580 was placed in a suitable reaction vessel equipped with a stirrer, temperature probe, a condenser and a nitrogen inlet tube and blanketed with nitrogen gas. A total of 88 grams of RESIN FROM EXAMPLE A was then added and mixed for 15 minutes at ambient temperature. Then, 0.02 grams of dibutyltin dilaurate was added and the mixture was heated slowly to 50° C., then to 80° C. and finally to 100° C. At this point the isocyanate equivalent weight was measured and found to be 656 grams per equivalent. The reaction mixture was then cooled to 80° C. and 77 grams of FYROL PCF, 390 grams of DESMODUR XP2580 and 210 grams of DESMODUR XP2410 were then added to the reaction mixture. The contents of the reactor were cooled and poured out. The final material was a clear, compatible resin with a measured solids of 98% and an isocyanate equivalent weight of 266 grams per equivalent.

Example C

A blended polyphosphate diol/phosphonate diol was prepared from the following ingredients:

| Ingredients | Amt in g |
|---|---|
| Charge 1 | |
| Exolit OP 550 (LV)[1] | 175.1 |
| Phenylphosphonic acid | 35.6 |
| Charge 2 | |
| Cardura E-10P[2] | 162.7 |
| Charge 3 | |
| Cardura E-10P[2] | 37.5 |

The ingredients of Charge 1 were charged to a suitable reactor equipped with a heating mantle, reflux condenser, overhead stirrer, thermocouple, and $N_2$ inlet. A $N_2$ blanket was applied to the reactor and the mixture heated over 1 hour to 140° C. Charge 2 was then added to the reaction mixture over a period of 3 hours. After a two hour hold, the acid value of the reaction mixture was found to have stabilized at 7.8 mg KOH/g. Charge 3 was added to the reactor over 0.5 hr, and the reaction mixture was held at temperature for an additional 2.3 hours, at which time no acid could be detected. After an additional 5.1 hours hold, the reaction mixture was sampled and found to have an epoxy equivalent weight of 9002 g/equiv. After an additional hold of 11.5 hours, the epoxy equivalent weight was found to be 29005 g/equiv. At this point the reaction mixture was poured out. The resulting resin was a clear viscous fluid and was found to have a measured solids (110° C., 1 hr) of 93.1 percent, a viscosity of Z3+ on the Gardner-Holt scale, an acid value of 0.1 mg KOH/g, an epoxy equivalent weight of 35687, a hydroxyl value of 90.3 mg KOH/g, and a $M_w$ of 1247, a $M_n$ of 584, a $M_z$ of 2231, and a peak molecular weight of 644 as determined by gel permeation chromatography versus a polystyrene standard.

Example D

A compatible isocyanate component comprising a phosphorus-containing isocyanate-functional prepolymer was prepared from the following ingredients as described below:

| Ingredients | Parts by Weight (grams) |
|---|---|
| ISOPHORONE DIISOCYANATE | 34 |
| RESIN FROM EXAMPLE C | 92 |
| Dibutyltin dilaurate | 0.02 |
| FYROL PCF[4] | 61 |
| DESMODUR XP2580[3] | 275 |
| DESMODUR XP2410[5] | 149 |

A total of 34 grams of ISOPHORONE DIISOCYANATE was placed in a suitable reaction vessel equipped with a stirrer, temperature probe, a condenser and a nitrogen inlet tube and blanketed with nitrogen gas. A total of 92 grams of RESIN FROM EXAMPLE C was then added and mixed for 15 minutes at ambient temperature. Then, 0.02 grams of dibutyltin dilaurate was added and the mixture was heated slowly to 50° C., then to 80° C. and finally to 100° C. At this point the isocyanate equivalent weight was measured and found to be 797 grams per equivalent. The reaction mixture was then cooled to 80° C. and 61 grams of FYROL PCF and 275 grams of DESMODUR XP2580 and 149 grams of DESMODUR XP2410 were then added to the reaction mixture. The contents of the reactor were cooled and poured out. The final material was a clear, compatible resin with a measured solids of 97% and an isocyanate equivalent weight of 267 grams per equivalent.

Example E

A blended polyphosphate diol/phosphonate diol was prepared from the following ingredients:

| Ingredients | Amt in g |
|---|---|
| Charge 1 | |
| Exolit OP 550 (LV)[1] | 136.2 |
| Phenylphosphonic acid | 110.6 |
| Charge 2 | |
| Propylene oxide | 121.8 |
| Charge 3 | |
| Propylene oxide | 30.4 |
| Charge 4 | |
| Propylene oxide | 10.0 |

The ingredients of Charge 1 were charged to a suitable reactor equipped with a heating mantle, reflux condenser, overhead stirrer, thermocouple, and $N_2$ inlet. A $N_2$ blanket was applied to the reactor and the mixture heated over 1 hour to 100° C. Charge 2 was then added to the reaction mixture over a period of 3.25 hours. After a two hour hold, the acid value of the reaction mixture was found to be 26.6 mg KOH/g. Charge 3 was added to the reactor over 0.75 hr, and the reaction mixture was held at temperature for an additional 2.1 hours. The reaction mixture was resampled and found have an acid value of 8.2. Charge 4 was added and held for an additional 1 hour. At that time, the acid value was determined to be 3.8 mg KOH/g resin. The reaction mixture was then subjected to vacuum at 60 mm Hg for 1 hour at the reaction temperature to remove any residual propylene oxide. The resulting resin was a clear viscous fluid and was found to have a measured solids (110° C., 1 hr) of 87.9 percent, a viscosity of V+ on the Gardner-Holt scale, an acid value of 4.3 mg KOH/g, an epoxy equivalent weight of >100000, a hydroxyl value of 242.7 mg KOH/g, and a $M_w$ of 532, a $M_n$ of 305, a $M_z$ of 808, and a peak molecular weight of 485 as determined by gel permeation chromatography versus a polystyrene standard.

Example F

A compatible isocyanate component comprising a phosphorus-containing isocyanate-functional prepolymer was prepared from the following ingredients as described below:

| Ingredients | Parts by Weight (grams) |
|---|---|
| DESMODUR XP2580[3] | 141 |
| RESIN FROM EXAMPLE E | 51 |
| Dibutyltin dilaurate | 0.03 |
| FYROL PCF[4] | 68 |
| DESMODUR XP2580[3] | 274 |
| DESMODUR XP2410[5] | 148 |

A total of 141 grams of DESMODUR XP2580 was placed in a suitable reaction vessel equipped with a stirrer, temperature probe, a condenser and a nitrogen inlet tube and blanketed with nitrogen gas. A total of 88 grams of RESIN FROM EXAMPLE E was then added and mixed for 15 minutes at ambient temperature. Then, 0.03 grams of dibutyltin dilaurate was added and the mixture was heated slowly to 50° C., then to 80° C. and finally to 100° C. At this point the isocyanate equivalent weight was measured and found to be 449 grams per equivalent. The reaction mixture was then cooled to 80° C. and 68 grams of FYROL PCF, 274 grams of DESMODUR XP2580 and 148 grams of DESMODUR XP2410 were then added to the reaction mixture. The contents of the reactor were cooled and poured out. The final material was a clear, compatible resin with a measured solids of 99% and an isocyanate equivalent weight of 264 grams per equivalent.

Example G

A phosphonate diol was prepared from the following ingredients:

| Ingredients | Amt in g |
| --- | --- |
| Charge 1 | |
| Phenylphosphonic acid | 711.0 |
| Butyl acetate | 720.0 |
| Charge 2 | |
| Propylene oxide | 522.0 |
| Charge 3 | |
| Propylene oxide | 209.5 |
| Charge 4 | |
| Propylene oxide | 47.3 |

The ingredients of Charge 1 were charged to a suitable reactor equipped with a heating mantle, reflux condenser, overhead stirrer, thermocouple, and $N_2$ inlet. A $N_2$ blanket was applied to the reactor and the mixture heated over 0.3 hour to 50° C. The heating mantle was then removed from the reactor. At this point the reaction mixture was a slurry. Charge 2 was then added to the reaction mixture over a period of 3.6 hours. An exotherm was observed; during the feed, the temperature of the reaction mixture varied from 41 to 58° C. Approximately 1 hour into the feed the reaction mixture began to clear. After a 3.3 hour hold, the acid value of the reaction mixture was found to be 43.1 mg KOH/g. Charge 3 was then added to the reactor over 2.75 hr over a temperature range of 52 to 63° C.; afterward, the reaction mixture was held at 52° C. for 1.1 hours. The reaction mixture was resampled and found have an acid value of 7.8 mg KOH/g. Charge 4 was then added at a temperature of 52° C. and then held for 1 hour. At that time, the acid value was determined to be 5.1 mg KOH/g resin. The reaction mixture was then subjected to vacuum at 50 mm Hg at 65° C. for 1 hour at the reaction temperature to remove butyl acetate. The temperature was raised to 75° C. at 60 mm Hg and held for 0.3 hour, then raised to 85° C. and held for 1 hour. The resulting resin was a clear viscous fluid and was found to have a measured solids (110° C., 1 hr) of 77.2 percent, a viscosity of U- on the Gardner-Holt scale, an acid value of 6.4 mg KOH, a hydroxyl value of 326.6 mg KOH/g, and a $M_w$ of 371, a $M_n$ of 329, a $M_z$ of 421, and a peak molecular weight of 272 as determined by gel permeation chromatography versus a polystyrene standard.

Example H

A compatible isocyanate component comprising a phosphorus-containing isocyanate-functional prepolymer was prepared from the following ingredients as described below:

| Ingredients | Parts by Weight (grams) |
| --- | --- |
| DESMODUR XP2580[3] | 398 |
| RESIN FROM EXAMPLE G | 108 |
| Dibutyltin dilaurate | 0.04 |
| FYROL PCF[4] | 121 |
| DURANATE TLA-100[6] | 556 |

[6]Polyisocyanate available from Asahi Kasei Chemicals Corporation.

A total of 398 grams of DESMODUR XP2580 was placed in a suitable reaction vessel equipped with a stirrer, temperature probe, a condenser and a nitrogen inlet tube and blanketed with nitrogen gas. A total of 108 grams of RESIN FROM EXAMPLE G was then added and mixed for 15 minutes at ambient temperature. Then, 0.04 grams of dibutyltin dilaurate was added and the mixture was heated slowly to 50° C., then to 80° C. and finally to 100° C. At this point the isocyanate equivalent weight was measured and found to be 413 grams per equivalent. The reaction mixture was then cooled to 80° C. and 121 grams of FYROL PCF and 556 grams of DURANATE TLA-100 were then added to the reaction mixture. The contents of the reactor were cooled and poured out. The final material was a clear, compatible resin with a measured solids of 98% and an isocyanate equivalent weight of 266 grams per equivalent.

Example I

A phosphonate diol was prepared from the following ingredients:

| Ingredients | Amt in g |
| --- | --- |
| Charge 1 | |
| Phenylphosphonic acid | 300.2 |
| Butyl acetate | 608.0 |
| Charge 2 | |
| Cardura E-10P[2] | 915.8 |
| Charge 3 | |
| Cardura E10P[2] | 81.3 |

The ingredients of Charge 1 were charged to a suitable reactor equipped with a heating mantle, reflux condenser, overhead stirrer, thermocouple, and $N_2$ inlet. A $N_2$ blanket was applied to the reactor and the mixture heated over 0.7 hour to 80° C. At this point the reaction mixture was a slurry. Charge 2 was then added to the reaction mixture over a period of 2 hours. At 1 hour into the feed the reaction mixture was clear. After a 3 hour hold, the acid value of the reaction mixture was found to be 7.6 mg KOH/g. Charge 3 was then added to the reactor and held for 0.75 hour. The reaction mixture was resampled and found have an acid value of 4.7 mg KOH/g. The reaction mixture was then subjected to vacuum at 60 mm Hg at 80° C. for 1 hour at the reaction temperature to remove butyl acetate. The temperature was raised to 75° C. at 60 mm Hg and held for 1.75 hour; vacuum was broken and the flask and contents weighed. Vacuum at 60 mm Hg was reapplied and the temperature raised to 90° C. for 1 hour. The strip was determined to still not be complete by weight. The vacuum was reapplied again for 1 hour at 90° C.; at this time the strip was considered to be complete. The resulting resin was a clear viscous fluid and was found to have a measured solids (110° C., 1 hr) of 90.1 percent, a viscosity of Z2- on the Gardner-Holt scale, an acid value of 3.1 mg KOH, a hydroxyl value of 158.6 mg KOH/g, and a $M_w$ of 643, a $M_n$ of 519, a $M_z$ of 769, and a peak molecular weight of 668 as determined by gel permeation chromatography versus a polystyrene standard.

Example J

A compatible isocyanate component comprising a phosphorus-containing isocyanate-functional prepolymer was prepared from the following ingredients as described below:

| Ingredients | Parts by Weight (grams) |
|---|---|
| ISOPHORONE DIISOCYANATE | 86 |
| RESIN FROM EXAMPLE I | 130 |
| Dibutyltin dilaurate | 0.02 |
| FYROL PCF[4] | 118 |
| DESMODUR XP2580[3] | 911 |

A total of 86 grams of ISOPHORONE DIISOCYANATE was placed in a suitable reaction vessel equipped with a stirrer, temperature probe, a condenser and a nitrogen inlet tube and blanketed with nitrogen gas. A total of 130 grams of RESIN FROM EXAMPLE I was then added and mixed for 15 minutes at ambient temperature. Then, 0.02 grams of dibutyltin dilaurate was added and the mixture heated slowly to 50° C., then to 80° C. and finally to 100° C. At this point the isocyanate equivalent weight was measured and found to be 540 grams per equivalent. The reaction mixture was then cooled to 80° C. and 124 grams of FYROL PCF and 943 grams of DESMODUR XP2580 were then added to the reaction mixture. The contents of the reactor were cooled and poured out. The final material was a clear, compatible resin with a measured solids of 96% and an isocyanate equivalent weight of 265 grams per equivalent.

Example K

An isocyanate component comprising isocyanate-functional prepolymer was prepared from the following ingredients as described below:

| Ingredients | Parts by Weight (grams) |
|---|---|
| DESMODUR XP2580[1] | 2264 |
| EXOLIT OP550[2] | 452 |
| LEVAGARD 4090N[3] | 279 |
| Dibutyltin dilaurate | 0.3 |
| FYROL PCF[4] | 840 |
| DESMODUR XP2580[1] | 2262 |
| DESMODUR XP2410[1] | 2262 |

[1]Available from Bayer Material Science Corporation.
[2]Available from Clariant Corporation.
[3]Available from Lanxess.
[4]Flame retardant available from Supresta.

A total of 2264 grams of DESMODUR XP2580 was placed in a suitable reaction vessel equipped with a stirrer, temperature probe, a condenser and a nitrogen inlet tube and blanketed with nitrogen gas. A total of 452 grams of EXOLIT OP550 and 279 grams of LEVAGARD 4090N were added and mixed for 15 minutes at ambient temperature. Then, 0.3 grams of dibutyltin dilaurate was added and the mixture heated slowly to 50° C., then to 80° C. and finally to 100° C. At this point the isocyanate equivalent weight was measured and found to be 431 grams per equivalent. The reaction mixture was then cooled to 80° C. and 840 grams of FYROL PCF, 2262 grams of DESMODUR XP2580 and 2262 grams of DESMODUR XP2410 were then added to the reaction mixture. The contents of the reactor were cooled and poured out. The final material had a measured solids of 96% and an isocyanate equivalent weight of 274 grams per equivalent.

Examples 1-8

Polyurea coating compositions of the invention (Examples 1-6) were prepared from combining an isocyanate functional "A" side component (materials comprising prepolymers comprising phosphorus diols of Examples B, D, F, H, and J, and K) and an amine functional "B" side component not containing phosphorus (BDL-1724S available from PPG Industries, Inc.) in the following manner: The A and B side components were charged to separate canisters and heated to 140° F. in an oven for 1-3 hours prior to spraying. Polyurea coating compositions were produced by mixing a 1:1 volume ratio of each of the A-side components to each the B-side components in a static mix tube applicator device available from Plas-Pak Industries, Inc. The coating compositions were applied by spraying to 6"×18" panels of a calcium silicate fiber reinformced autoclaved building sheet containing fibers of natural origin (available under the designation Tunnel Board Z from Taylored Industries, Indianola, Pa.) at a film thickness of 70 to 90 mils. Tack times for the coatings were determined by periodically touching the panel with a gloved hand and were judged to be tack free when the glove no longer stuck to the coatings. In all cases the coatings were tack free in <2 minutes. The ratio of equivalents of isocyanate to amine were within the range of 1.0 to 1.1 Two comparative examples (Examples 7 and 8) were also applied in the manner described above. In these examples, the isocyanate "A" side component was CAT-128 (available from PPG Industries, Inc.) which does not contain a phosphorus diol. In Example 8, the "B" side component was furthermore a 95:5 blend by weight of BDL-1724 and Fyrol PCF.

The polyurea coatings prepared as described above were tested for flame resistance in accordance with ASTM E 162-02. In this test method, the coated substrate to be tested is held near a radiant heat source, where the top of the substrate is 1¾" away from the heat source and leaning at a 30° angle. A pilot flame is brought into contact with the top of the coated substrate in an attempt to ignite the coating. The distance that the flame travels down the coated substrate is monitored versus time. The temperature of the exhaust stack above the burning coating is also monitored. Per the test method a "flame spread index" ($I_s$) is calculated from flame spread factor ($F_s$) and the heat evolution factor (Q). In most of the examples (although not all), the test was run in duplicate or triplicate. Table 1 shows the results of this testing.

TABLE 1

| Example | "A" side component | $I_s 1$ | $I_s 2$ | $I_s 3$ | Average $I_s$ |
|---|---|---|---|---|---|
| 1 | Isocyanate component of Example B | 71.4 | 84.0 | 77.7 | 77.6 |
| 2 | Isocyanate component of Example D | 74.1 | 89.5 | | 81.8 |

TABLE 1-continued

| Example | "A" side component | $I_s$ 1 | $I_s$ 2 | $I_s$ 3 | Average $I_s$ |
|---|---|---|---|---|---|
| 3 | Isocyanate component of Example F | 72.5 | 58.2 | 83.3 | 71.3 |
| 4 | Isocyanate component of Example H | 68.0 | 77.5 | 78.9 | 75.0 |
| 5 | Isocyanate component of Example J | 102.7 | 111.0 | 85.5 | 100.0 |
| 6 (comparative) | CAT-128 | 260 | 305 | | 283 |
| 7 (comparative) | CAT-128 | 194 | | | 194 |

Examples 1-5 illustrate that the polyurea coating compositions comprising isocyanate components comprising isocyanate functional prepolymers comprising phosphorus diols have superior flame resistance compared to comparable coating compositions comprising an isocyanate component not made with phosphorus diols (Examples 6 and 7). Furthermore, Example 7 demonstrates that a composition with a non-reactive phosphorus flame retardant without a phosphorus diol in the isocyanate component prepolymer does not afford the same degree of flame resistance as compositions with both the phosphorus flame retardant and the phosphorus diol in the isocyanate component.

Therefore, what is claimed is:

1. A coating composition comprising polyurea formed from a reaction mixture comprising:
   (a) a first component comprising isocyanate, wherein said isocyanate comprises an isocyanate functional prepolymer formed from a reaction mixture comprising an isocyanate and a material comprising a phosphorus-containing polyol; and
   (b) a second component comprising an amine, wherein the ratio of equivalents of isocyanate groups to equivalents of amine groups is greater than 1 and the isocyanate and the amine can be applied to a substrate at a volume mixing ratio of 1:1.

2. The composition of claim 1, wherein the material is a flame retardant material.

3. The composition of claim 1, wherein the phosphorus-containing polyol comprises polyphosphate diol, phosphite diol and/or blends thereof.

4. The composition of claim 1, wherein the first component further comprises a non-prepolymer isocyanate.

5. The composition of claim 1, wherein the reaction mixture further comprises one or more of polyol, polythiol and/or polyamine.

6. The composition of claim 5, wherein the polyol comprises butanediol, polytetramethylene ether glycol, or mixtures thereof.

7. The composition of claim 1, further comprising a flame retardant material added to the first component, the second component, or both.

8. The composition of claim 7, wherein the flame retardant material comprises halogenated phosphate, halogen-free phosphate, tris(2-chloropropyl)phosphate, tris(2,3-dibromopropyl)phosphate, tris(1,3-dichloropropyl)phosphate, diammonium phosphate, powdered or fumed silica, layered silicate, aluminum hydroxide, brominated fire retardant, halogenated aromatic compound, antimony oxide, alumina trihydrate, metal borates, zinc borate, barium metaborate pentahydrate, phosphate esters, polyvinyl chloride, melamine cyanurate, melamine phosphates, polymelamine phosphates, melamine pyrophosphates, polymelamine pyrophosphates, melamine borate, other melamine derivatives, and combinations thereof.

9. The composition of claim 7, wherein the flame retardant material comprises graphite.

10. The composition of claim 1, wherein the ratio of equivalents of isocyanate groups to equivalents of hydroxyl groups is greater than 1.

11. The composition of claim 1, wherein the phosphorus-containing polyol is the reaction product of an initial phosphorus-containing polyol and an epoxy functional compound.

12. The composition of claim 11, wherein the epoxy functional compound comprises ethylene oxide, propylene oxide, 1,2-epoxybutane, butyl glycidyl ether, neodecanoic acid glycidyl ester, or combinations thereof.

13. The composition of claim 1, wherein the phosphorus-containing polyol is the reaction product of a phosphorus-containing acid, an epoxy functional compound, and, optionally, an initial phosphorus-containing polyol.

14. A coating composition comprising polyurea formed from a reaction mixture comprising:
   (a) a first component comprising an isocyanate functional prepolymer and a non-prepolymer isocyanate, wherein said isocyanate functional prepolymer is substantially compatible with said non-prepolymer isocyanate, and wherein said isocyanate functional prepolymer is formed from a reaction mixture comprising an isocyanate and a material comprising a phosphorus-containing polyol; and
   (b) a second component comprising an amine, wherein the ratio of equivalents of isocyanate groups to equivalents of amine groups is greater than 1 and the isocyanate and the amine can be applied to a substrate at a volume mixing ratio of 1:1.

15. The coating composition of claim 14, further comprising a flame retardant material is added to the first component, the second component, or both.

16. The coating composition of claim 14, wherein the phosphorus-containing polyol is the reaction product of an initial phosphorus-containing polyol and an epoxy functional compound.

17. The composition of claim 16, wherein the epoxy functional compound comprises ethylene oxide, propylene oxide, 1,2-epoxybutane, butyl glycidyl ether, neodecanoic acid glycidyl ester, or combinations thereof.

18. The composition of claim 14, wherein the phosphorus-containing polyol is the reaction product of a phosphorus-containing acid, an epoxy functional compound, and, optionally, an initial phosphorus-containing polyol.

* * * * *